US010176583B2

(12) United States Patent
Cho et al.

(10) Patent No.: US 10,176,583 B2
(45) Date of Patent: Jan. 8, 2019

(54) TOPOLOGICAL DERIVATIVE-BASED IMAGE SEGMENTATION METHOD AND SYSTEM WITH HETEROGENEOUS IMAGE FEATURES

(71) Applicant: KOREA ELECTRONICS TECHNOLOGY INSTITUTE, Seongnam-si, Gyeonggi-do (KR)

(72) Inventors: Choong Sang Cho, Seongnam-si (KR); Hwa Seon Shin, Yongin-si (KR); Young Han Lee, Yongin-si (KR); Joo Hyung Kang, Daejeon (KR)

(73) Assignee: Korea Electronics Technology Institute, Seongnam-si, Gyeonggi-do (KR)

( * ) Notice: Subject to any disclaimer, the term of this patent is extended or adjusted under 35 U.S.C. 154(b) by 175 days.

(21) Appl. No.: 15/342,890

(22) Filed: Nov. 3, 2016

(65) Prior Publication Data
US 2017/0124720 A1 May 4, 2017

(30) Foreign Application Priority Data
Nov. 4, 2015 (KR) .......................... 10-2015-0154470

(51) Int. Cl.
*G06K 9/00* (2006.01)
*G06T 7/11* (2017.01)

(52) U.S. Cl.
CPC ...... *G06T 7/11* (2017.01); *G06T 2207/10024* (2013.01); *G06T 2207/10028* (2013.01); *G06T 2207/10088* (2013.01); *G06T 2207/30016* (2013.01)

(58) Field of Classification Search
CPC . G06T 2207/10024; G06T 2207/10028; G06T 2207/10088; G06T 2207/30016
See application file for complete search history.

(56) References Cited

U.S. PATENT DOCUMENTS

| | | | | |
|---|---|---|---|---|
| 2003/0016306 | A1* | 1/2003 | Ogata | G06T 5/007 348/671 |
| 2014/0214370 | A1* | 7/2014 | Olhofer | G06F 17/50 703/1 |

OTHER PUBLICATIONS

Zhou, Jinghao, et al. "Vascular structure segmentation and bifurcation detection." Biomedical Imaging: From Nano to Macro, 2007. ISBI 2007. 4th IEEE International Symposium on. IEEE, 2007.*
Cho, Choong Sang, and Sangkeun Lee. "Low-complexity topological derivative-based segmentation." IEEE Transactions on Image Processing 24.2 (2015): 734-741.*
Cho, Choongsang, and Sangkeun Lee. "Effective five directional partial derivatives-based image smoothing and a parallel structure design." IEEE Transactions on Image Processing 25.4 (2016): 1617-1625.*

(Continued)

*Primary Examiner* — Jonathan S Lee
(74) *Attorney, Agent, or Firm* — Knobbe Martens

(57) ABSTRACT

Provided herein is a topological derivatives (TDs)-based image segmentation method and system using heterogeneous image features data. The image segmentation method according to an embodiment of the present disclosure involves calculating TDs having each of the heterogeneous image features data as an input value, and segmenting an image into a plurality of regions using the calculated TDs. Accordingly, performance may be improved, and robustness against noise may be further improved.

8 Claims, 23 Drawing Sheets

(56) References Cited

OTHER PUBLICATIONS

Qian, Zhen, Dimitris N. Metaxas, and Leon Axel. "A learning framework for the automatic and accurate segmentation of cardiac tagged MRI images." International Workshop on Computer Vision for Biomedical Image Applications. Springer, Berlin, Heidelberg, 2005.*

Office Action issued by the Korean Intellectual Property Office dated Jun. 5, 2017 in the corresponding Korean Patent Application No. 10-2015-0154470.

I. Larrabide, et al., "Topological Derivative: A Tool for Image Processing," Dec. 11, 2006, pp. 1-31.

* cited by examiner

| Features | Weight factors of the weighted total TD. | | | | |
| --- | --- | --- | --- | --- | --- |
| | Gray image | Gradient | Red | Green | Blue |
| Gray image with gradient | 0.9 | 0.1 | - | - | - |
| Color image | - | - | 0.33 | 0.33 | 0.33 |
| Color image with gradient | - | 0.1 | 0.3 | 0.3 | 0.3 |

FIG. 8

TOPOLOGICAL DERIVATIVE-BASED IMAGE SEGMENTATION METHOD AND SYSTEM WITH HETEROGENEOUS IMAGE FEATURES

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The present disclosure relates to image segmentation, and more particularly, to a TD (Topological Derivative)-based image segmentation method and system.

Description of the Related Art

Development in technologies related to medical equipment improves medical services and public health. That is because it enables medical workers to conduct improved analyses on medical images of patients, such as CT, MRI and PET, etc.

Of such medical image analyses, image segmentation is necessary for disease diagnosis/estimation, cancer detection/treatment, surgery planning/monitoring and identification of arteries, etc.

Image segmentation technologies are classified into various methods. Specifically, image segmentation technologies include the LS (level set) method, which is a region-based AC (active contour) method, the edge-based AC method, and the TD (topological derivative) method.

Of these methods, the TD-based segmentation method is most robust against noise, providing stable segmentation results even when the noise level is high.

Currently, the TD-based image segmentation depends on only image intensity data.

SUMMARY

One inventive aspect relates to solving the aforementioned problems, for example, by providing a TD-based image segmentation method and system that uses various heterogeneous image features data.

According to an embodiment of the present disclosure, there is provided an image segmentation method including obtaining heterogeneous image features data; calculating each TD (Topological Derivative) having each of the obtained image features data as an input value; and segmenting an image into a plurality of regions using the calculated TDs.

Further, the segmenting may further include summing the calculated TDs, wherein the image may be segmented into the plurality of regions with reference to a result of the summation.

Further, the summing may involve applying a weighted value to each of the calculated TDs and summing the result.

Further, the segmenting may further include updating the image features data and classes with reference to the result of the summation, wherein the image may be segmented into the plurality of regions using the updated result.

Further, the updating may involve determining image features data to be updated with reference to whether the result of the summation has a positive (+) or negative (−) value.

Further, the calculating and the segmenting may be iterated until a certain condition is satisfied.

Further, the certain condition may require a cost generated from the updated result to be less than a threshold value.

Further, the cost may be an average of the costs for each of the image features data.

Further, the updating may involve generating candidates for each of the classes, calculating a cost for each of the generated candidates, and updating the class with the candidate having a minimum cost.

Further, the image may include a 2D image and a 3D image.

Further, the image features data may be data independent from one another.

Further, the image features data may include at least two of brightness, color, edge, gradient, eigen-vector and convexity.

Meanwhile, according to another embodiment of the present disclosure, there is provided an image system including an image provision unit configured to provide an image; and a processor configured to obtain heterogeneous image features data for the image provided by the image provision image, calculate each TD (Topological Derivative) having each of the obtained heterogeneous image features data as an input value, and segment an image into a plurality of regions using the calculated TDs.

Further, the processor may sum the calculated TDs, and segment the image into a plurality of regions with reference to a result of summation.

Meanwhile, according to an embodiment of the present disclosure, there is provided an information segmentation method including obtaining heterogeneous features data; calculating each TD (Topological Derivative) having each of the obtained features data as an input value, and segmenting formation represented by the features data into a plurality of groups using the calculated TDs.

As explained above, according to the embodiments of the present disclosure, the TD-based image segmentation is possible using various heterogeneous image features data, thereby further improving performance and further increasing robustness against noise.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present between two elements. Like reference numerals refer to like elements throughout.

FIGS. 3A, 3B, 4A, 4B, 4C, 4D, 4E, 4F, 4G, 4H, 5A, 5B, 6A, 6B, 6C, 6D, 6E, 6F, 6G, 6H, 7A, 7B, 7C, 7D, 7E, 7F, 7G, 7H, 8, 9A, 9B, 9C and 9D are computer simulation results for performance evaluation of the image segmentation method according to an embodiment of the present disclosure;

DETAILED DESCRIPTION

Figure 1:
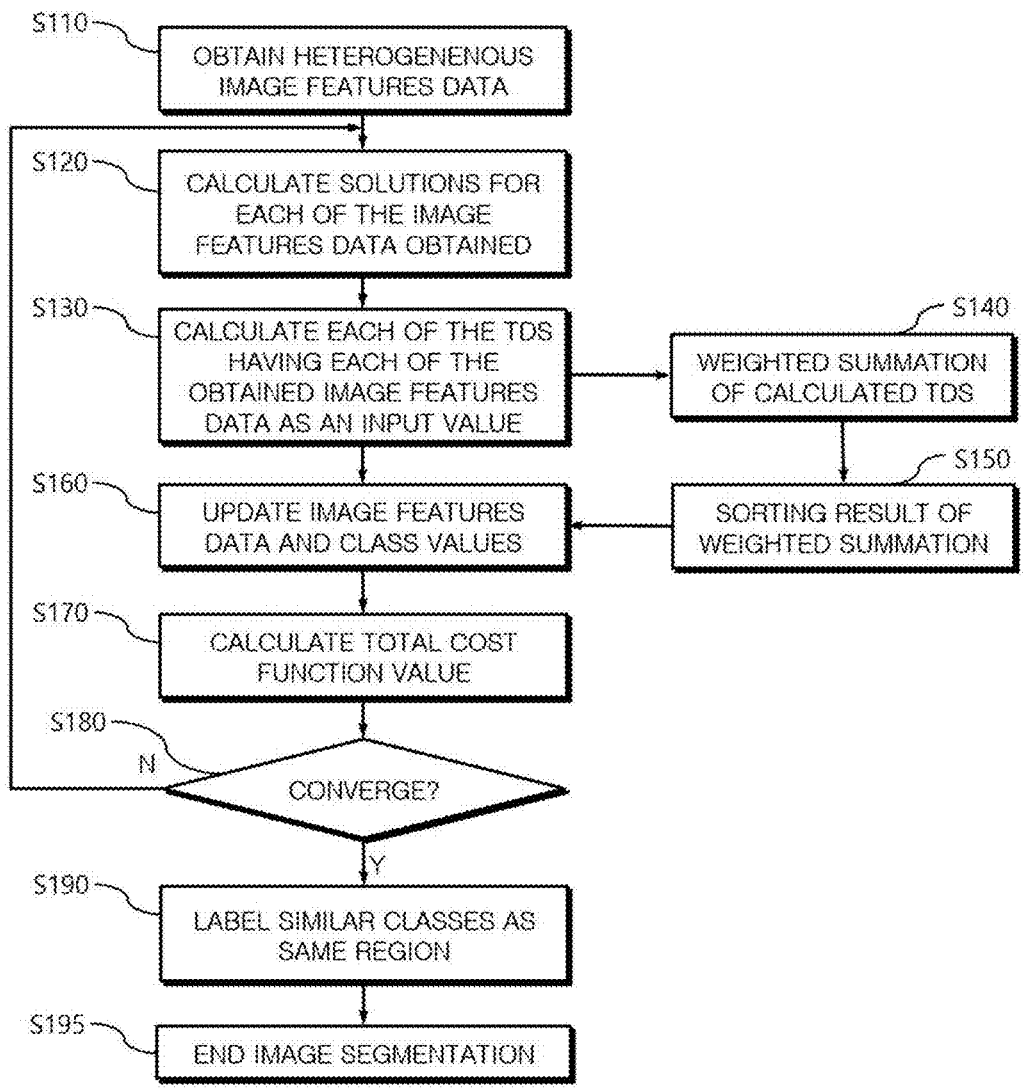
FIG. 1 is a flowchart provided to explain a TD-based image segmentation method according to an embodiment of the present disclosure.

Hereinafter, an embodiment of the present disclosure will be explained in detail with reference to the exemplary drawings attached. In adding a reference numeral to each element in the drawings, it should be noted that like elements use like reference numerals if possible even if the elements are illustrated in other drawings. Further, in explaining an embodiment of the present disclosure, any specific explanation on a well-known configuration or function regarded as possibly obscuring the main point of the present disclosure will be omitted.

Hereinafter, the present disclosure will be explained in further detail with reference to the drawings attached.

FIG. 1 is a flowchart provided to explain the TD-based image segmentation method according to an embodiment of the present disclosure. The TD-based image segmentation method according to the embodiment of the present disclosure computes a plurality of TDs based on a plurality of image features data input, and performs image segmentation.

For this purpose, first of all, multiple pieces of heterogeneous image features data are obtained (S110). The multiple pieces of image features data obtained at step S110 are data expressing images, independently from one another.

In other words, the step S110 can be said as a process of expressing each pixel constituting an image using multiple pieces of image features data.

Examples of the image features data that may be used herein include intensity, color, edge, gradient, eigen-vector and the like, but there is no limitation thereto. Any data may be used as image features data as long as it is data expressing an image.

Next, solutions for each of the image features data obtained at step S110 are calculated (S120). Assuming there are L pieces of image features data, the $l^{th}$ ($1 \leq l \leq L$) image features data, $\varphi_l$, is calculated through the formula below.

Here, K represents the diffusion tensor, β represents the weighted value, $v_l$ $$\int_{\Omega_l} K \nabla \eta \cdot \nabla \varphi_l d\Omega_l + \int_{\Omega_l} \eta \varphi_l d\Omega_l = \beta \int_{\Omega_l} (v_l - u_l) \eta d\Omega_l$$

represents the $l^{th}$ input image features data, and $u_l$ represents the $l^{th}$ output image features data.

Then, the TD (Topological Derivative) of each of the image features data obtained at step S110 is calculated (S130). In the calculation of step S130, the solutions calculated at the step S120 are used. The TDs are calculated through the formula below.

Here, $\hat{D}_T(\hat{x})$ represents L number of TDs to be calculated, and may be expressed as follows.

$$\hat{D}_T(\hat{x}) = \frac{1}{2}(\hat{c}_i - \hat{u})\{[\hat{\varphi} - (\hat{v} - \hat{u})] + [\hat{\varphi} - (\hat{v} - \hat{c}_i)] + [2(1 - \beta)\hat{\varphi}]\}$$

$$\hat{D}_T(\hat{x}) = \{\hat{D}_1, \ldots, \hat{D}_L\}.$$

$\hat{v}$ and $\hat{u}$ each represents input image features data and output image features data, respectively, that may be expressed as follows.

$$\hat{v} = \{v_1, \ldots, v_l, \ldots, v_L\}$$
$$\hat{u} = \{u_1, \ldots, u_l, \ldots, u_L\},$$
$$l = \{1, \ldots, L\}$$

$\hat{c}_i$ is the variable representing classes, and may be expressed as follows.

$$\hat{C} = \{\hat{c}_i = (c_{1,i}, \ldots, c_{k,i}) \subset \hat{v} : i = 1, \ldots, N_c\}$$

Next, to each of the TDs calculated at step S130, a weighted value is applied, respectively, and then summed (S140). The weighted summation of the TDs may be expressed as the formula below.

$$D_T(\hat{x}) = \sum_{l=1}^{L} w_l \hat{D}_l$$
$$= w^T \hat{D}_T(\hat{x}),$$

with $$\sum_{l=1}^{L} w_l = 1$$

$w_l$ is the weighted value to be applied to the $l^{th}$ TD, and may expressed as below.

$$w = \{w_1, \ldots, w_L\}$$

Thereafter, the weighted summation results of step S140 are sorted (S150), and the image features data and class values are updated (S160). Specifically, pixels having negative (−) weighted summation are sorted at step S150, and the image features data of the sorted pixels are updated with a class of minimum TD at step S160.

Further, candidates, $\{\hat{c}_i - \Delta s, \hat{c}_i, \hat{c}_i + \Delta s\}$, for class, $\hat{c}_i$, are generated using Δs, the cost for each candidate is calculated, and class, $\hat{c}_i$, is updated with the candidate having the minimum cost.

Next, a total value of cost functions is calculated having the updated results of step S160 as input values (S170). The cost function for one piece of image features data is as in the formula below.

$$\psi_T(\Omega_l) = \frac{1}{2} \int_{\Omega_l} K \nabla \varphi_l \cdot \nabla \varphi_l d\Omega_l + \frac{1}{2} \int_{\Omega_l} [\varphi_l \cdot (v_l - u_l)]^2 d\Omega_l$$

Further, the total cost function is an average of the cost functions for the multiple pieces of image features data, and may be expressed as below.

$$\psi_T(\hat{\Omega}) = \frac{1}{L}\sum_{l=1}^{L}\psi_T(\Omega_l)$$

Steps S120 to S170 are iterated until the total value the cost functions calculated at step S170 converges below a threshold value (S180). When the iteration is completed (S180-Y), similar classes are labeled as same region (S190), and the image segmentation ends (S195).

Figure 2:
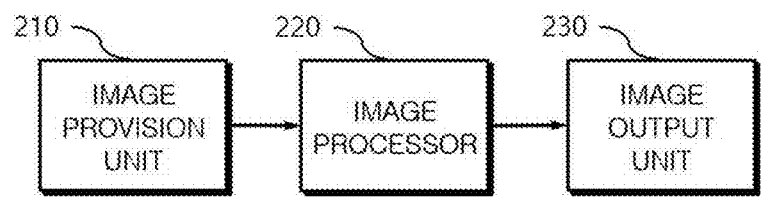
FIG. 2 is a block diagram of an image system according to another embodiment of the present disclosure.

FIG. 2 is a block diagram of an image system according to another embodiment of the present disclosure. The image system according to the embodiment of the present disclosure performs the TD-based image segmentation using various heterogeneous image data.

The image system according to the embodiment of the present disclosure performing such a function includes an image provision unit 210, an image processor 220 and an image output unit 230, as illustrated in FIG. 2.

The image provision unit 210 is a means for providing images to the image processor 220, which may not only be a storage medium configured to provide images stored therein, but also a communication means for providing images received from an external device or an external network.

The image processor 220 executes the TD-based image segmentation using a various heterogeneous image features data in FIG. 1.

The image output unit 230 may be a display configured to display a result of image segmentation by the image processor 220 on a screen, or a communication means configured to provide the result to an external device or a network.

Hereinafter, computer simulation results of performance of the image segmentation method according to the embodiment of the present disclosure will be presented. The computer simulations were performed by executing matlab with a 28 GB RAM and a 3.3 GHz Intel i7-3960 processor.

Figure 3A:
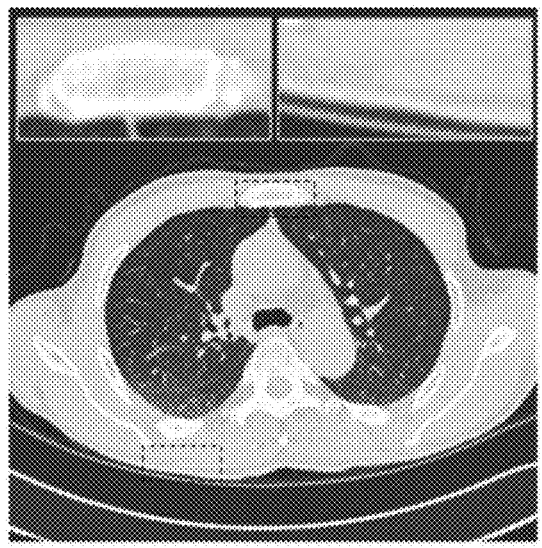
Figure 3B:
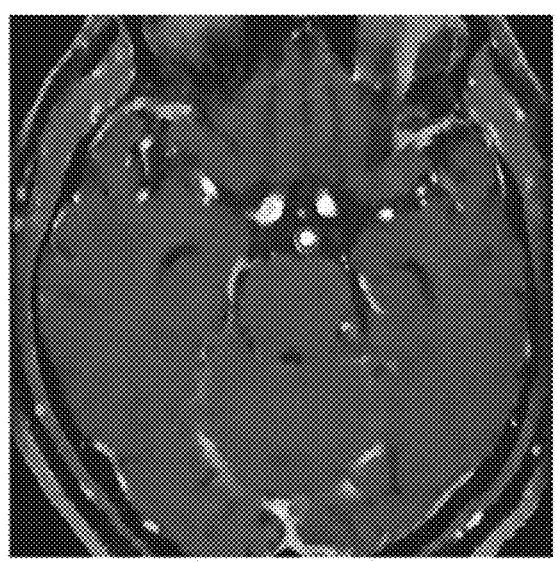

FIGS. 3A and 3B are original copies of medical images. The size of image of an abdominal region in FIG. 3A is 902×906, and the size of image of a brain in FIG. 3B is 256×256. FIGS. 4A to 4H show simulation results of image segmentation performed on the images of FIGS. 3A and 3B using various methods.

Figure 4A:
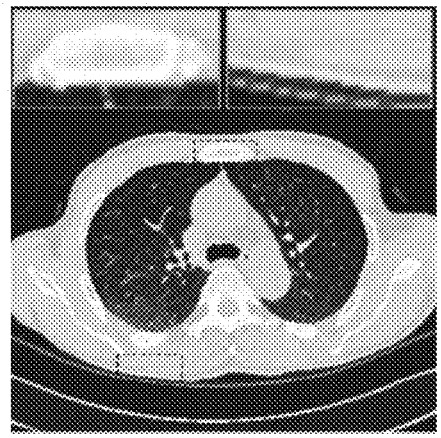
Figure 4B:
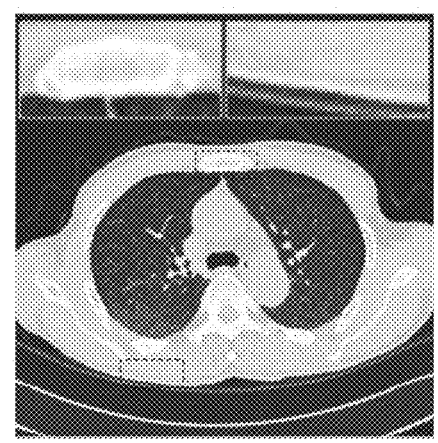
Figure 4C:
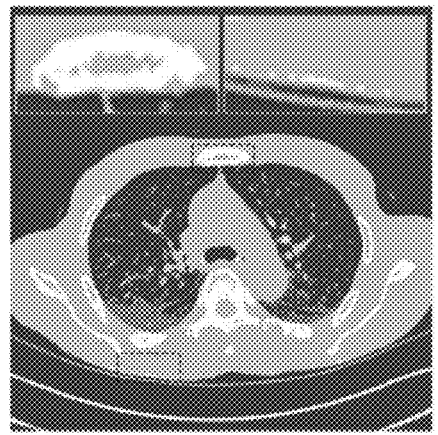
Figure 4D:
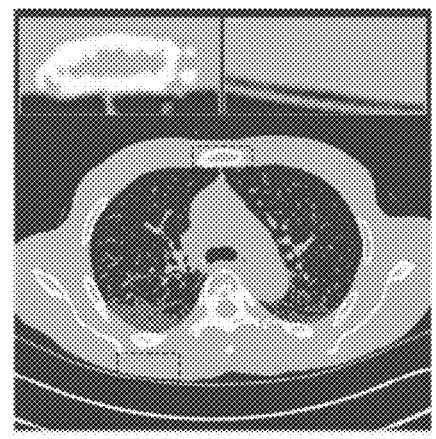
Figure 4E:
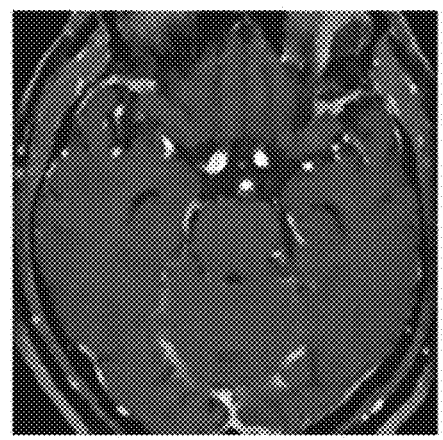
Figure 4F:
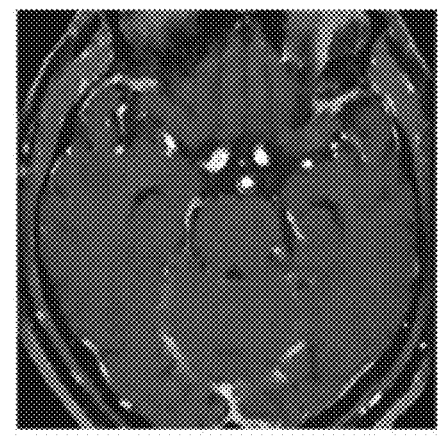
Figure 4G:
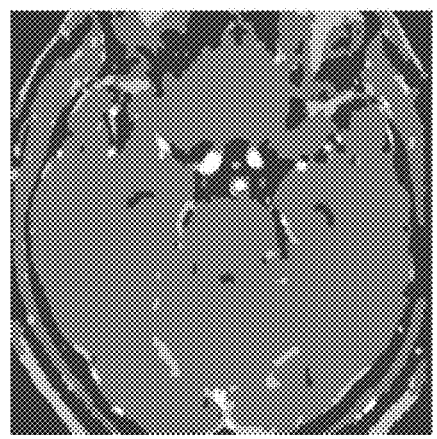
Figure 4H:
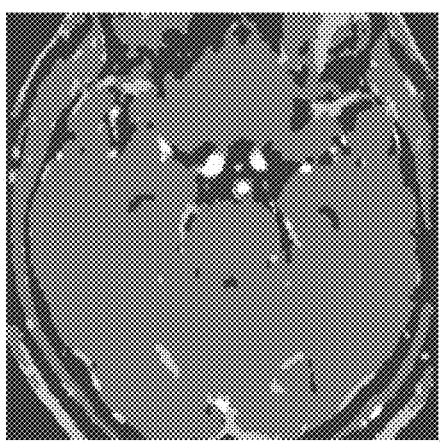

FIGS. 4A and 4E are image segmentation results by the LS method, FIGS. 4B and 4F are image segmentation results by the AC method, FIGS. 4C and 4G are image segmentation results by the conventional TD method, and FIGS. 4D and 4H are image segmentation results by the TD method according to the embodiment of the present disclosure. In the TD method according to the embodiment of the present disclosure, brightness and gradient were used as image features data.

One can see from FIGS. 4A to 4H that the performance of the TD methods are excellent compared to the LS method and the AC method, and that among the TD methods, the TD method according to the embodiment of the present disclosure shows better performance.

For more detailed comparison, dotted line regions from the abdominal images in FIGS. 4A to 4D have been enlarged and shown. From the enlarged image at the left side, one can see that the TD method according to the embodiment of the present disclosure differentiates the ring-type spine most distinctly. Further, from the enlarged image at the right side, one can see that no errors occurred in the TD method according to the embodiment of the present disclosure, unlike the conventional TD method.

Figure 5A:
Figure 5B:
Figure 6A:
Figure 6B:
Figure 6C:
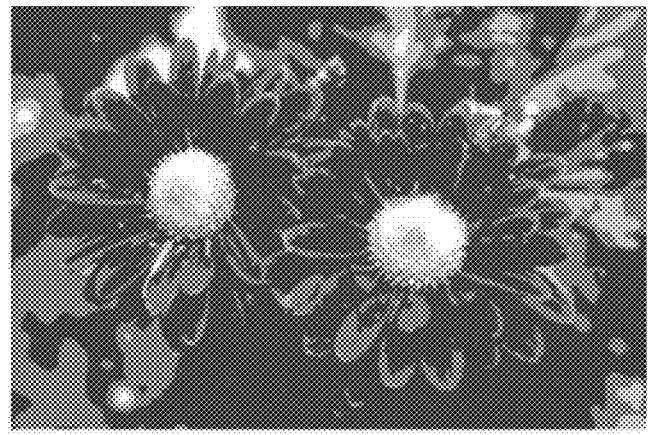
Figure 6D:
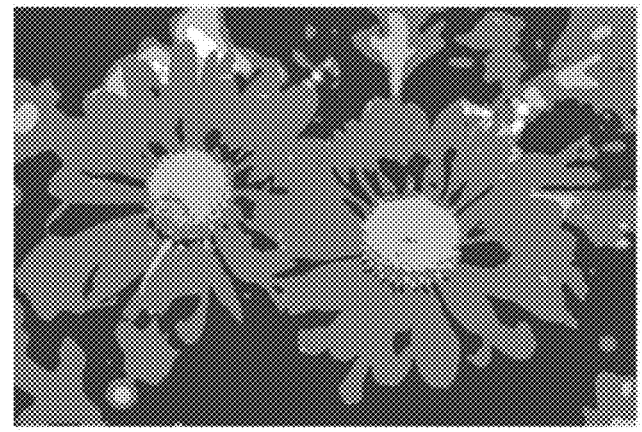
Figure 6E:
Figure 6F:
Figure 6G:
Figure 6H:

FIGS. 5A and 5B are original copies of general color images. FIGS. 6A to 6H show simulation results of image segmentation performed on the images of FIGS. 5A and 5B using various methods. FIGS. 6A and 6E are image segmentation results by the LS method, FIGS. 6B and 6H are image segmentation results by the AC method, FIGS. 6C and 6G are image segmentation results by the conventional TD method, and FIGS. 6D and 6H are image segmentation results by the TD method according to the embodiment of the present disclosure.

In the LS method, the AC method and the conventional TD method, color images are converted into gray (brightness) images and then used. In the TD method according to the embodiment of the present disclosure, color and gradient of gray image were used.

From FIGS. 6A to 6H, one can also see that the TD method according to the embodiment of the present disclosure shows the most excellent performance.

Figure 7A:
Figure 7B:
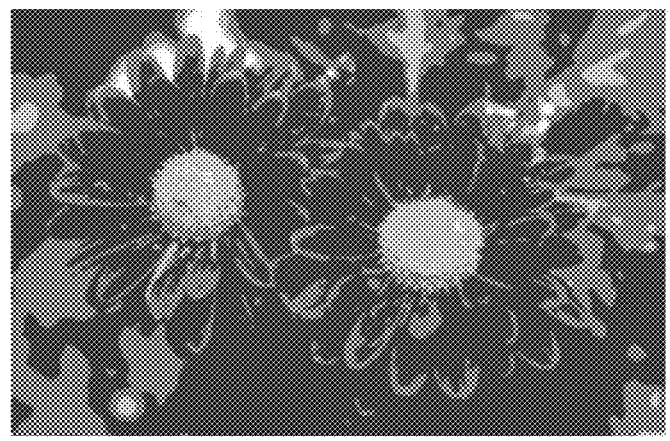
Figure 7C:
Figure 7D:
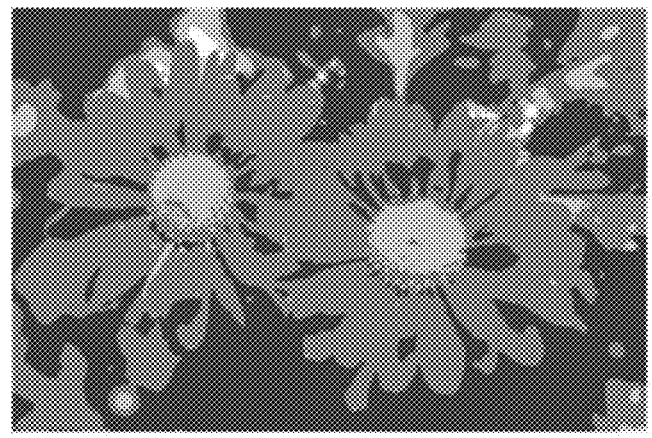
Figure 7E:
Figure 7F:
Figure 7G:
Figure 7H:

FIGS. 7A to 7H shows results of simulation performed while configuring the image features data being used in the TD method according to the embodiment of the present disclosure in various ways. FIGS. 7A and 7E are simulation results when only gray images (brightness) were used (that is, conventional TD method), FIGS. 7B and 7F are simulation results when brightness and gradient were used, FIGS. 7C and 7G are simulation results when R-color, G-color and B-color were used, and FIGS. 7D and 7H are simulation results when gradient, R-color, G-color and B-color were used.

Further, the weighted value for each of the image features data was applied according to the table presented in FIG. 8.

From FIG. 7A to 7H, one can see that the segmentation performance was most excellent when color data and gradient of gray images were used.

Therefore, in order to derive an adequate combination of the color data and gradient of gray images, simulations were performed with varying weighted values, and the results were illustrated in FIGS. 9A to 9D.

Figure 9A:
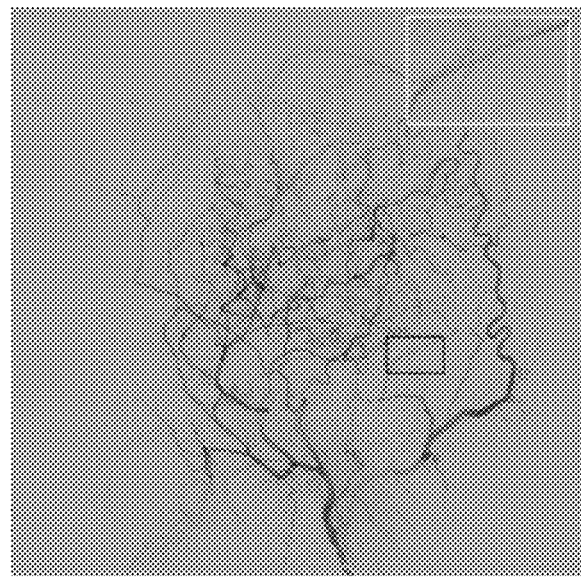
Figure 9B:
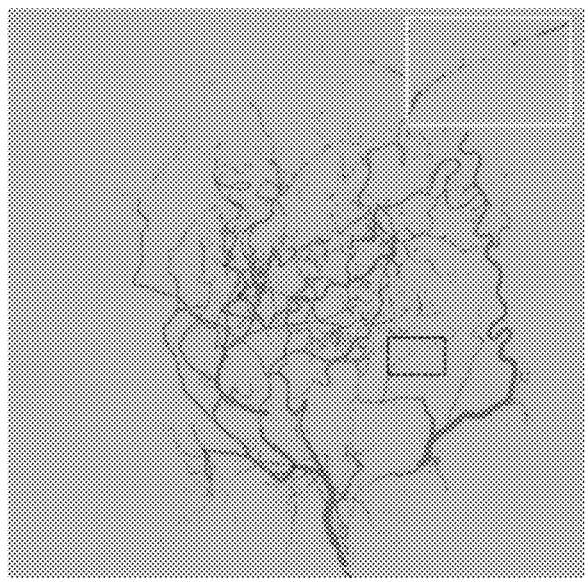
Figure 9C:
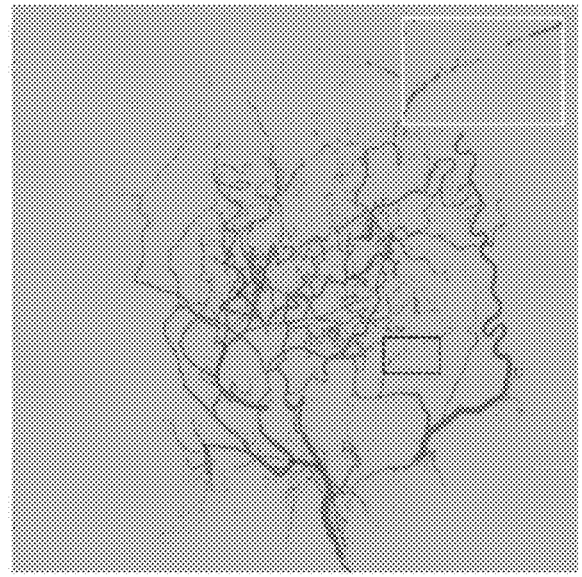
Figure 9D:
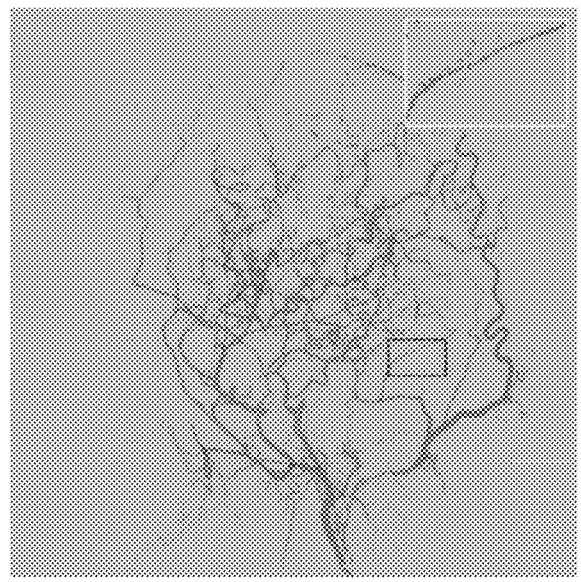
Figure 10A:
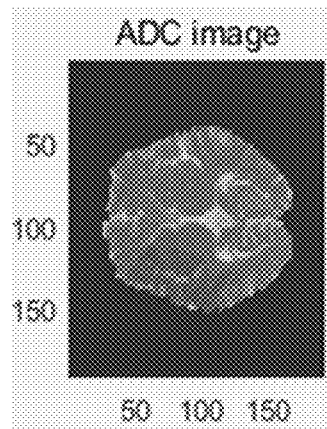
FIGS. 10A, 10B, 10C, 10D, 10E and 10F are various MR images obtained to diagnose an ischemic stroke lesion.
Figure 10B:
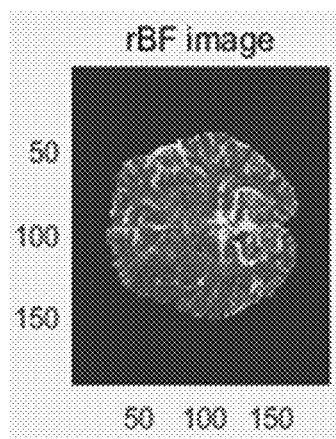
Figure 10C:
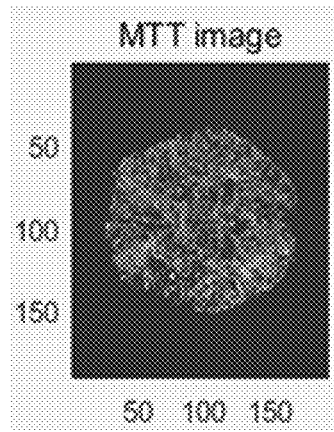
Figure 10D:
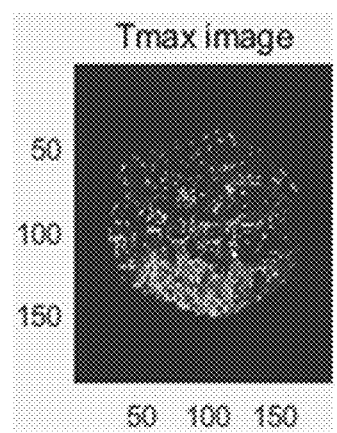
Figure 10E:
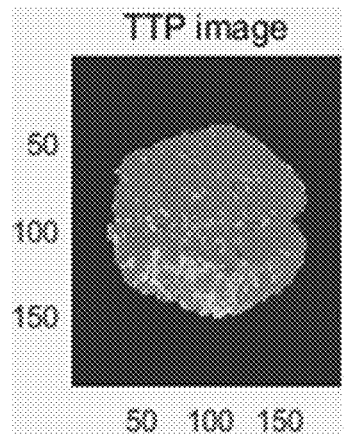
Figure 10F:
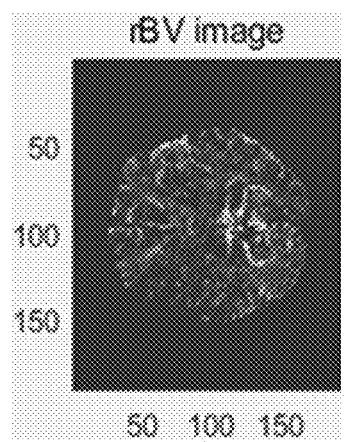

FIG. 9A is the original copy of a medical image (cerebrovascular image), FIG. 9B is the image segmentation results of the conventional TD-method, and FIGS. 9C and 9D are results of the TD-based image segmentation performed using gray images and their gradients. Weighted values of 0.9 and 0.1 were respectively applied to FIG. 9C, while weighted values of 0.7 and 0.3 were respectively applied to FIG. 9D.

For more detailed comparison, dotted line regions from the images of FIGS. 9A to 9D are each enlarged and shown on its upper right side. Upon comparison, one can see that segmentation was performed most clearly in FIG. 9D, which is where a greater weighted value of gradient was applied, thereby showing the most excellent performance. This seems to be because, in the case of cerebrovascular images, edges have a great effect on image segmentation.

Thus, one comes to a conclusion that it is desirable to place a greater weighted value to main image features data.

Various MR images may be simultaneously analyzed in order to diagnose an ischemic stroke lesion. That is, when analyzing and photographing a brain with MR, not just one image, but various types of images may be obtained per feature, for example, an ADC image, an rBF image, an MTT image, a Tmax image, a TTP image and an rBV image may be obtained as illustrated in FIGS. 10A to 10F.

In such a case, in the TD-based image segmentation method according to the embodiment of the present disclosure, it is possible to compute a plurality of TDs by performing image segmentation having such various MR images as input values, thereby discovering and analyzing a lesion.

Figure 11:
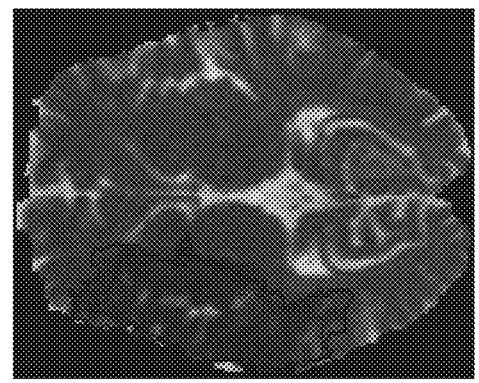
FIG. 11 is a result image of detecting an ischemic stroke lesion region.

A result of the TD-based image segmentation according to the embodiment of the present disclosure is presented in FIG. 11. The dotted line in FIG. 11 indicates an ischemic stroke region marked by a doctor, while the solid line indicates a result discovered by the TD-based image segmentation method according to the embodiment of the present disclosure.

The result discovered by the TD-based image segmentation method according to the embodiment of the present disclosure shows that it is similar to the region marked by the doctor, recording precision of 73%, recall of 0.99 and dicescore of 0.84.

So far, the TD-based image segmentation method and system using heterogeneous image features data of the present disclosure was explained in detail based on desirable embodiments.

Although only segmentation on 2D images was mentioned hereinabove, the TD-based image segmentation method according to the embodiment of the present disclosure may have other image features data besides brightness as input values, and thus the TD-based image segmentation method according to the present disclosure may also be applied to 3D images.

Figure 12:
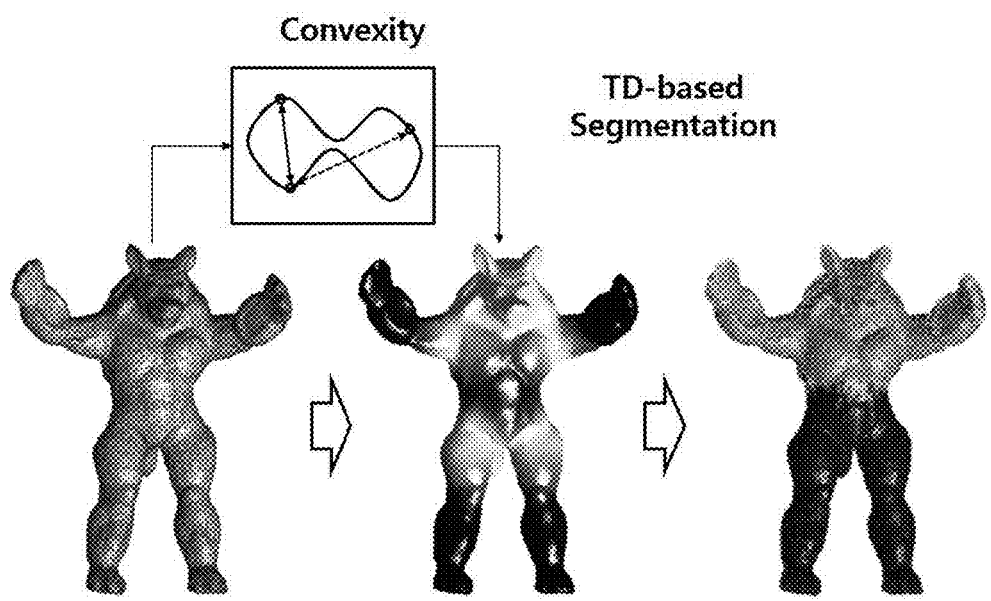
FIG. 12 is a view provided to explain a TD-based 3D image segmentation method according to another embodiment of the present disclosure.

For example, as illustrated in FIG. 12, a 3D image (3D object) may be segmented into a plurality of regions (objects). This is useful when segmenting a 3D image (3D object) and 3D printing the same.

If the 3D image data is 3D graphics data composed of vertices and face, multiple pieces of image features data may be extracted using 3D image features called convexity.

That is, a normalized affinity matrix (W) that represents a convexity between vertexes may be computed, and then the computed normalized affinity matrix may be applied to SVD (singular value decomposition) to obtain eigen vectors, and then image features data of n-dimension may be obtained.

Thereafter, using the obtained image features data, the aforementioned TD-based image segmentation may be performed.

Further, the TD-based image segmentation method using heterogeneous image features data according to the embodiment of the present disclosure may also be applied to other information besides images.

That is, the technological concept of the present disclosure may of course be applied to a case of calculating each TD having heterogeneous features data as input values, and segmenting information representing the features data into a plurality of groups using the calculated TDs.

In the drawings and specification, there have been disclosed typical embodiments of the invention, and although specific terms are employed, they are used in a generic and descriptive sense only and not for purposes of limitation. It will be understood by those of ordinary skill in the art that various changes in form and details may be made therein without departing from the spirit and scope of the present invention as defined by the following claims.

What is claimed is:

1. An image segmentation method comprising:
   (a) obtaining heterogeneous image features data;
   (b) calculating a plurality of topological derivatives (TDs) respectively for the obtained image features data; and
   (c) segmenting an image into a plurality of regions using the calculated TDs,
   wherein (c) segmenting the image comprises:
      summing the calculated TDs,
      updating the image features data with reference to result of the summation of the calculated TDs, and
      segmenting the image into the plurality of regions using the updated image features data,
   wherein (b) and (c) are iterated until an average of costs generated from the updated image features data is less than a threshold value.

2. The image segmentation method of claim 1, wherein the summing involves applying a weighted value to each of the calculated TDs and summing the result.

3. The image segmentation method of claim 1, wherein the updating involves determining image features data to be updated with reference to whether the result of the summation has a positive(+) or negative(−) value.

4. An image segmentation method comprising:
obtaining heterogeneous image features data;
calculating a plurality of topological derivatives (TDs) respectively for the obtained image features data; and
segmenting an image into a plurality of regions using the calculated TDs,
wherein segmenting the image comprises:
   summing the calculated TDs,
   updating the image features data and classes with reference to a result of the summation of the calculated TDs, and
   segmenting the image into the plurality of regions using the updated image features data and classes,
wherein the updating involves generating candidates for each of the classes, calculating a cost for each of the generated candidates, and updating the class with the candidate having a minimum cost.

5. The image segmentation method of claim 1, wherein the image comprises a 2D image and a 3D image.

6. The image segmentation method of claim 1, wherein the image features data are data independent from one another.

7. The image segmentation method of claim 6, wherein the image features data comprise at least two of brightness, color, edge, gradient, eigen-vector and convexity.

8. An image system comprising:
an image provision unit configured to provide an image; and
a processor configured to:
   (a) obtain heterogeneous image features data;
   (b) calculate a plurality of topological derivatives (TDs) respectively for the obtained image features data; and
   (c) sum the calculated TDs,
   (d) update the image features data with reference to a result of summation of the calculated TDs, and
   (e) segment the image into the plurality of regions using the updated image features data,
wherein the processor is configured to repeat (b) and (e) until an average of costs generated from the updated image features data is less than a threshold value.

* * * * *